Patented Apr. 9, 1929.

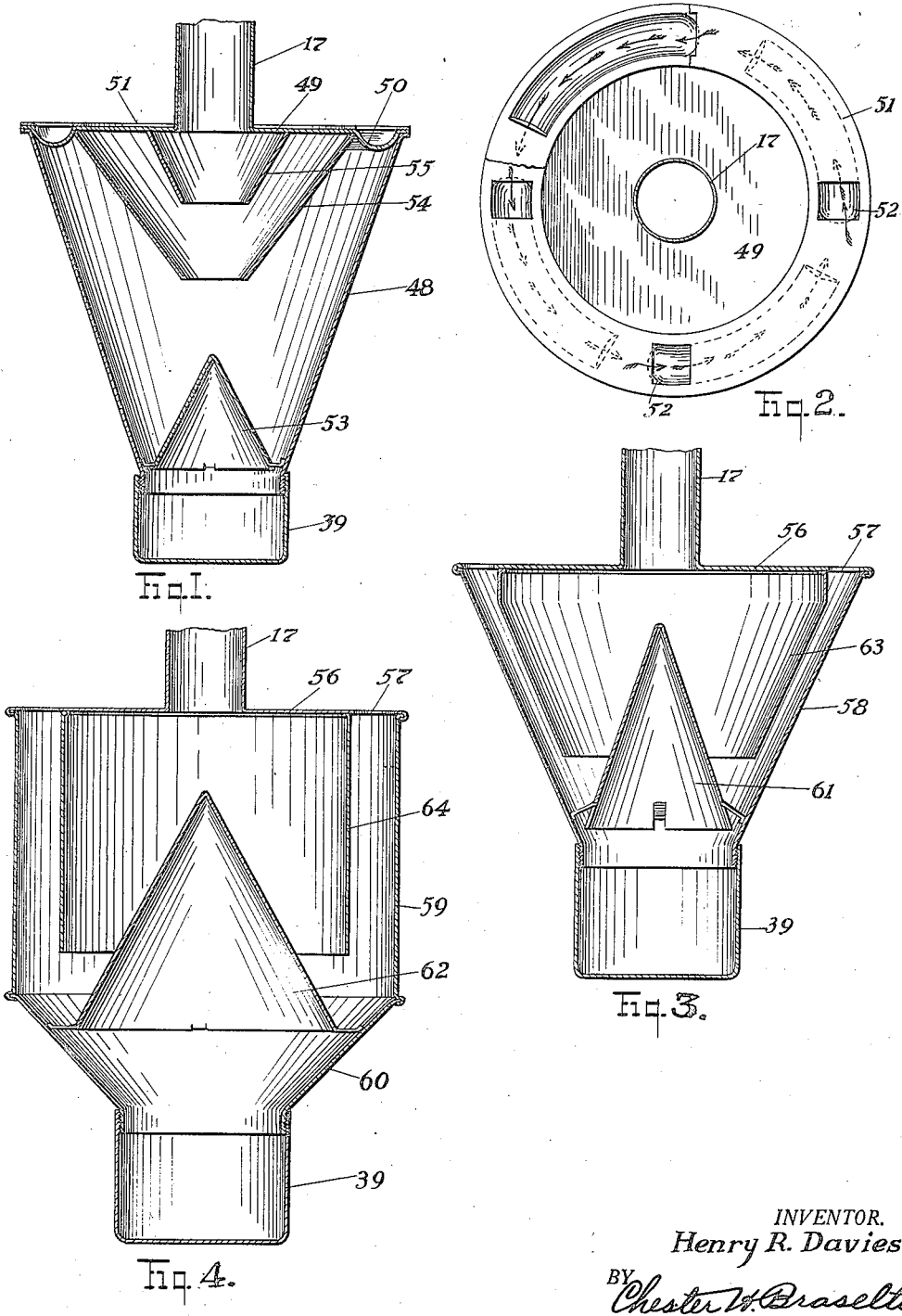

1,708,122

UNITED STATES PATENT OFFICE.

HENRY R. DAVIES, OF VALLEY COTTAGE, NEW YORK, ASSIGNOR TO INDUSTRIAL RESEARCH CORPORATION, OF TOLEDO, OHIO, A CORPORATION OF DELAWARE.

AIR CLEANER.

Application filed May 29, 1919, Serial No. 300,617. Renewed August 29, 1928.

This invention relates to improvements in air cleaners for removing dust and other foreign matter from the air about to enter the air intake of an internal combustion engine.

One of the objects of the invention is the provision of a cleaner of this character which shall accomplish the cleaning operation without the use of a sieve or dust-tight cloth, either of which when it becomes dirty chokes the air inlet and hence requires attention at frequent intervals.

A further object is the provision of a dust receptacle in which the dust and foreign particles are deposited, said receptacle being arranged to permit ready removal for cleaning purposes.

Other objects, and objects relating to details of construction and economies of manufacture, will appear as I proceed with the description of those embodiments of the invention, which, for the purposes of the present application, I have illustrated in the accompanying drawings, in which:

Fig. I is a vertical, sectional view of one form of the invention.

Fig. II is a plan view of the structure in Fig. I, parts being broken away.

Figs. III and IV are vertical sectional views of further modifications.

Similar reference characters refer to like parts throughout the views.

In Fig. I of the drawing one form of my air cleaner is shown which is of the type capable of use in connection with an internal combustion engine, the pipe connection 17 leading to the air inlet of the fuel mixture chamber of the engine.

Figs. I and II show a casing for the air cleaner made up of a single section 48, having the form of an inverted frustum of a cone. The inlet pipe 17 terminates flush with the top 49, which has depressions 50 therein, there being four in number distributed about the circumference of the plate 49. One end of these depressions communicates with the interior of the casing. These depressions are covered, except at their closed ends, by a ring 51 which is secured to the top 49 and is provided with holes 52 through which air may enter the depressions 50. The conical baffle 53 is supported upon and spaced from the sides of the casing, and a dust cup is threaded upon the bottom of the casing. Two baffles 54 and 55, also shaped like inverted frustums of cones, are secured to the top 49 in concentric positions inside the depressions 50. The entering air takes a spiral downward course, depositing some of its dust upon the walls of the casing 48 and baffle 54 and some upon the baffle 53. Then, in response to the series of impulses caused by the engine suction, the lighter, cleaner air, which is in the center, travels upwardly, directly through the openings in the baffles 54 and 55 and into the exit pipe 17. Around the sides of this rising column there is air carrying more or less dust which moves somewhat less rapidly than that directly in the center. Some of it is caught by the lower edges of the baffles 54 and 55 and deflected outwardly where it forms eddies, with the result that dust is deposited, and the air thus cleaned gradually returns to the center again.

The cleaners shown in Figs. III and IV are somewhat similar in construction and operation as that shown in Figs. I and II. In both cases there is a flat top 56 having a series of perforations 57 near its periphery and carrying the air exit pipe 17 at its center. In Fig. III the casing consists of a single part 58 of the shape of an inverted frustum of a cone, while in Fig. IV there are two parts, namely, a cylindrical section 59 and an inwardly sloping bottom section 60. Conical baffles 61 and 62 are supported upon and separated from the casing sections 58 and 60 respectively. In each figure there is an upper annular baffle, but each is caused to take the form of the casing with which it is employed, the baffle 63 sloping inwardly parallel to the casing 58, and the baffle 64 having vertical walls parallel to those of the casing section 59. The air enters the openings 57 and travels down comparatively slowly in the narrow annular space between the casing and the upper baffles, depositing dust on the walls during its motion. Then in making a quick turn around the lower edges of the baffle 63 or 64, the heavier particles are thrown inwardly against the baffles 61 or 62, as the case may be, and still more dust is deposited.

I am aware that the particular embodiments of my invention above described, and illustrated in the accompanying drawings, are susceptible of considerable variation without departing from the spirit thereof, and therefore I desire to claim my invention broadly as well as specifically, as indicated by the appended claims.

I claim as my invention:

1. An air cleaner having a casing shaped substantially like an inverted truncated cone, said casing having an air inlet opening at its upper end near the periphery, and a plurality of inverted truncated conical baffle plates with imperforate walls secured to the top of said casing concentrically, said opening being outside the outer one of said baffle plates, the top of the casing having a central air exit and an upright cone positioned within said casing and adjacent the inner of said inverted truncated cones.

2. In an air cleaner, a casing, one end of said casing being provided with an air exit at the center, one end of said casing being provided with air inlet openings at the periphery, and trough shaped air guides mounted upon the latter end of the casing covering said air inlet openings and extending in the arc of a circle, each of said guides being open at one end to the interior of the casing, whereby the entering air is given a tendency towards motion in a circle said air guides being positioned in planes parallel to the casing end to which they are attached.

3. In an air cleaner, a casing comprising a side section, and top and bottom end sections, the top end section being provided with an air exit at the center, and air inlet openings at its periphery, an auxiliary end section mounted inside of and adjacent to said last named end section, said auxiliary section having integral trough shaped air guides opposite said inlet opening and extending in the arc of a circle, each of said guides open at one end to the interior of the casing, whereby the entering air is given a tendency toward motion in a circle.

4. In an air cleaner, the combination of a truncated conical casing having large and small ends; detachable dust collector closing said small casing end; closure means for the large casing end having inlet and outlet air conduits and including a plate connecting the large casing end; and a plurality of separate air friction surfaces within said casing adapted to hold dust particles from the in-casing air.

5. In an air cleaner, the combination of a truncated conical casing having large and small ends; detachable dust collector closing said small casing end; closure means for the large casing end having inlet and outlet air conduits and including a plate connecting the large casing end; and a plurality of separate air friction surfaces within said casing adapted to hold dust particles from the in-casing air, one of said surfaces forming a cone converging toward the outlet conduit.

6. In an air cleaner, the combination of a casing having inlet and outlet conduits; a receptacle for dust particles; and a plurality of superimposed projecting surfaces adjacent the outlet conduit, adapted to form dead air pockets.

7. In an air cleaner, the combination of a casing having inlet and outlet conduits; a dust receptacle attached to the casing; and a plurality of inner and continuous projecting surfaces adjacent said conduits, and dust receptacle, adapted to form dead air pockets thereabout.

8. In an air cleaner, the combination of a casing having inlet and outlet conduits; a receptacle for dust particles; and a plurality of superimposed and downwardly depending projecting surfaces adjacent and surrounding the outlet conduit, adapted to form dead air pockets.

9. In an air cleaner construction, the combination of a truncated conical casing having means adapted to be positioned with its lower end at its base; detachable closure means for the small end of said casing forming a dust receptacle; closing means for the rear end of the casing including a plate secured to the casing edge and having inlet and outlet apertures formed therein; and means within the casing for separating dust and other solid particles from the gases passing therethrough.

10. In an air cleaner construction, the combination of a truncated conical casing having means adapted to be positioned with its lower end at its base; detachable closure means for the small end of said casing forming a dust receptacle; closing means for the rear end of the casing including a plate secured to the casing edge and having inlet and outlet apertures formed therein; and means within the casing for separating dust and other solid particles from the gases passing therethrough, said inlet aperture being positioned at a distance greater from the casing axis than the outlet aperture.

11. In an air cleaner construction, the combination of a truncated conical casing having open ends adapted to be positioned with its axis approximately vertical; means for closing the small end of the casing; additional means for closing the large end of the casing; a channel formed circumferentially in said large end closure, said channel communicating at one end with the interior of the casing and at the other end with the exterior of the casing, whereby an enclosed circumferential passage-way is formed and an exit conduit formed centrally in said large end closure.

12. In an air cleaner construction, the combination of a truncated conical casing having open ends; a detachable closure for the smaller of said ends adapted to receive dust or other solid matter separated from gases passing through said cleaner; an air deflecting hood positioned above said closure and adjacent thereto forming with said closure a dead air chamber; and means for closing the large end of said casing having inlet and outlet apertures formed therein; and inlet air deflecting plates depending from the large end closing means interior of the inlet apertures.

13. In an air cleaner, the combination of a casing having inlet and outlet conduits; a receptacle for dust particles; and a plurality of superposed projecting surfaces adjacent and surrounding the outlet conduit adapted to form dead air pockets.

14. In an air cleaner construction, the combination of a truncated conical casing; detachable closure means for the small end of said casing forming a dust receptacle; closing means for the other end of said casing including a plate secured to said casing and having inlet and outlet apertures formed therein; and means within the casing for separating dust and other solid particles from the gases passing therethrough.

15. In an air cleaner construction, the combination of a truncated conical casing; detachable closure means for the small end of said casing forming a dust receptacle; closing means for the other end of said casing including a plate secured to the casing having inlet and outlet apertures formed therein, said inlet aperture being positioned at a distance from the axis of said casing; and means within the casing for separating dust particles from the gases passing therethrough.

In testimony whereof, I affix my signature.

HENRY R. DAVIES.